US008411614B2

(12) United States Patent
Shin et al.

(10) Patent No.: US 8,411,614 B2
(45) Date of Patent: Apr. 2, 2013

(54) APPARATUS FOR MOBILE SATELLITE COMMUNICATIONS AND METHOD OF CONTROLLING COMMUNICATIONS ROUTE

(75) Inventors: Min Su Shin, Daejeon (KR); Jang Hee Kang, Daejeon (KR); Dae Ig Chang, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 504 days.

(21) Appl. No.: 12/628,485

(22) Filed: Dec. 1, 2009

(65) Prior Publication Data

US 2010/0135198 A1 Jun. 3, 2010

(30) Foreign Application Priority Data

Dec. 2, 2008 (KR) .................. 10-2008-0121252
Apr. 9, 2009 (KR) .................. 10-2009-0030889

(51) Int. Cl.
*H04B 7/185* (2006.01)
*H04Q 7/00* (2006.01)

(52) U.S. Cl. ....... 370/316; 370/334; 370/392; 455/3.02; 455/428; 455/13.1

(58) Field of Classification Search .......... None
See application file for complete search history.

(56) References Cited

U.S. PATENT DOCUMENTS

| 4,823,142 | A | * | 4/1989 | Ohe et al. ............... 343/713 |
| 5,537,679 | A | | 7/1996 | Crosbie et al. |
| 5,615,222 | A | | 3/1997 | Wright et al. |
| 6,085,076 | A | | 7/2000 | Lindsay et al. |
| 2002/0006159 | A1 | * | 1/2002 | Wagner et al. ............... 375/224 |
| 2002/0191634 | A1 | | 12/2002 | Okamura et al. |
| 2004/0143785 | A1 | | 7/2004 | Lee |
| 2005/0254525 | A1 | * | 11/2005 | Diamond et al. ............. 370/503 |
| 2005/0276239 | A1 | * | 12/2005 | Smallcomb et al. .......... 370/316 |
| 2006/0053446 | A1 | | 3/2006 | Kim et al. |
| 2007/0011719 | A1 | | 1/2007 | Lin |
| 2007/0281604 | A1 | * | 12/2007 | Morris et al. ................. 455/3.02 |
| 2008/0240280 | A1 | * | 10/2008 | Li .................................. 375/267 |
| 2008/0261522 | A1 | * | 10/2008 | Dankberg et al. ............. 455/13.1 |

FOREIGN PATENT DOCUMENTS

| JP | 2002-190758 | 7/2002 |
| JP | 2004-128658 | 4/2004 |
| KR | 2002-0079971 | 10/2002 |

(Continued)

OTHER PUBLICATIONS

Fumiaki Nagase, et al., "Layer 3 Diversity Reception Technology for Ku-Band Mobile Satellite Communication Systems", IEICE Trans. Commun., vol. E89-B, No. 6, pp. 1856-1861, Jun. 2006.

*Primary Examiner* — Yemane Mesfin
*Assistant Examiner* — Christine Duong
(74) *Attorney, Agent, or Firm* — Staas & Halsey LLP

(57) ABSTRACT

A mobile satellite transmission/reception apparatus and a communications route control method using the same are disclosed. The mobile satellite transmission/reception apparatus comprises: a first antenna unit configured to receive a signal along a first communications route; a second antenna unit configured to receive a signal along a second communications route; and a data processor configured to compare cyclic redundancy check (CRC) values with respect to packet streams of signals respectively received by the first and second antenna units, and change communications route to one of the first and second communications routes if packets having the same CRC value are detected.

2 Claims, 4 Drawing Sheets

FOREIGN PATENT DOCUMENTS

| | | |
|---|---|---|
| KR | 10-2004-0048239 | 6/2004 |
| KR | 10-2006-0022903 | 3/2006 |
| KR | 10-2007-0017033 | 2/2007 |
| WO | 01/65749 | 9/2001 |

* cited by examiner

APPARATUS FOR MOBILE SATELLITE COMMUNICATIONS AND METHOD OF CONTROLLING COMMUNICATIONS ROUTE

CROSS-REFERENCE TO RELATED APPLICATIONS

This application claims the priorities of Korean Patent Application Nos. 10-2008-0121252 filed on Dec. 2, 2008, and 10-2009-0030889 filed on Apr. 9, 2009, in the Korean Intellectual Property Office, the disclosures of which are incorporated herein by reference.

BACKGROUND OF THE INVENTION

1. Field of the Invention

The present invention relates to an apparatus for mobile satellite communications and method of controlling communications route, and more particularly, to a satellite transmission/reception apparatus capable of controlling communications routes such that satellite signals are received along mutually different communications routes ceaselessly, and a method for controlling a communications route.

2. Description of the Related Art

In general, in order to transmit IP communications data via an existing bi-directional satellite transmission system, the IP communications data is encapsulated using an MPE/MPEG-2 TS packet structure and then transmitted according to a particular modulation scheme. Such an MPE (Multi-Protocol Encapsulation) method, which has been proposed to transmit communications data by using a digital broadcast transmission/reception system at an early stage, is a method applying a data communications protocol to a digital broadcasting system to allow a receiver to process communications data transmitted via a broadcasting network in the same manner as data received via a communications network such as Ethernet.

The most basic method for selecting a new network interface to perform handover in such mobile communications is switching to an interface with a high received signal strength by using received signal strength indication (RSSI), to which determination bases such as a QoS factor, user preference, network availability, and the like, may be added to improve a cost function for network selection. However, these methods, focusing only on a network switching time or its method, have a problem in that a seamless data transmission in IP layers, according to handover, is not guaranteed.

SUMMARY OF THE INVENTION

An aspect of the present invention provides a satellite transmission/reception apparatus capable of controlling communications routes to allow satellite signals received along mutually different communications routes to be received ceaselessly, and a method for controlling communications routes.

According to an aspect of the present invention, there is provided a mobile satellite transmission/reception apparatus including: a first antenna unit configured to receive a signal along a first communications route; a second antenna unit configured to receive a signal along a second communications route; and a data processor configured to compare cyclic redundancy check (CRC) values with respect to packet streams of signals respectively received by the first and second antenna units, and change a communications route to one of the first and second communications routes if packets having the same CRC value are detected (found).

The data processor may include: a first CRC unit configured to execute CRC on the packet stream of the signal received by the first antenna unit; a second CRC unit configured to execute CRC on the packet stream of the signal received by the second antenna unit; and a route selection unit configured to compare the CRC values of each packet of the packet streams of the signals received by the first and second antenna units, and change a pre-set communications route to a different communications route if packets having the same CRC value are detected.

The first antenna unit may directly receive a signal which has been transmitted from a satellite, and the second antenna unit may receive a signal which has been transmitted from a satellite, via a repeater.

The mobile satellite transmission/reception apparatus may further include: a third antenna unit configured to receive a signal along the first communications route and disposed at a pre-set interval from the first antenna.

The data processor may include: first to third CRC units configured to be connected to the first to third antenna units, respectively, and execute CRC on signal packet streams received by the respective antennas; first to third buffers connected to the first to third CRC units, respectively, and to compensate for a time difference generated between the packet streams of the signals received by the first to third antennas; an antenna diversity block configured to output a normal packet when at least one of corresponding packets in the packet stream which has passed through the first buffer and the packet stream which has passed through the third buffer is normal; a fourth buffer configured to compensate for a time difference generated between a packet stream output from the antenna diversity block and the packet stream which has passed through the second buffer; and a route selection unit configured to compare the CRC values of packets of packet streams output from the second and fourth buffers and change a pre-set communications route to a different communications route if packets having the same CRC value are detected.

According to another aspect of the present invention, there is provided a method for changing a pre-set communications route in a mobile satellite transmission/reception apparatus for transmitting and receiving the same signal along first and second communications routes, the method including: measuring a CRC value of a packet stream of a signal received along the first communications route and a packet stream of a signal received along the second communications route; comparing the CRC values of the packets of the packet stream of the signal received along the first communications route and the packets of the packet stream of the signal received along the second communications route; and if packets having the same CRC values in the packet stream of the signal received along the first communications route and in the packet stream of the signal received along the second communications route are detected, changing a pre-set communications route to a different communications route.

The first communications route may directly receive a signal which has been transmitted from a satellite, and the second communications route may receive a signal which has been transmitted from a satellite, via a repeater.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
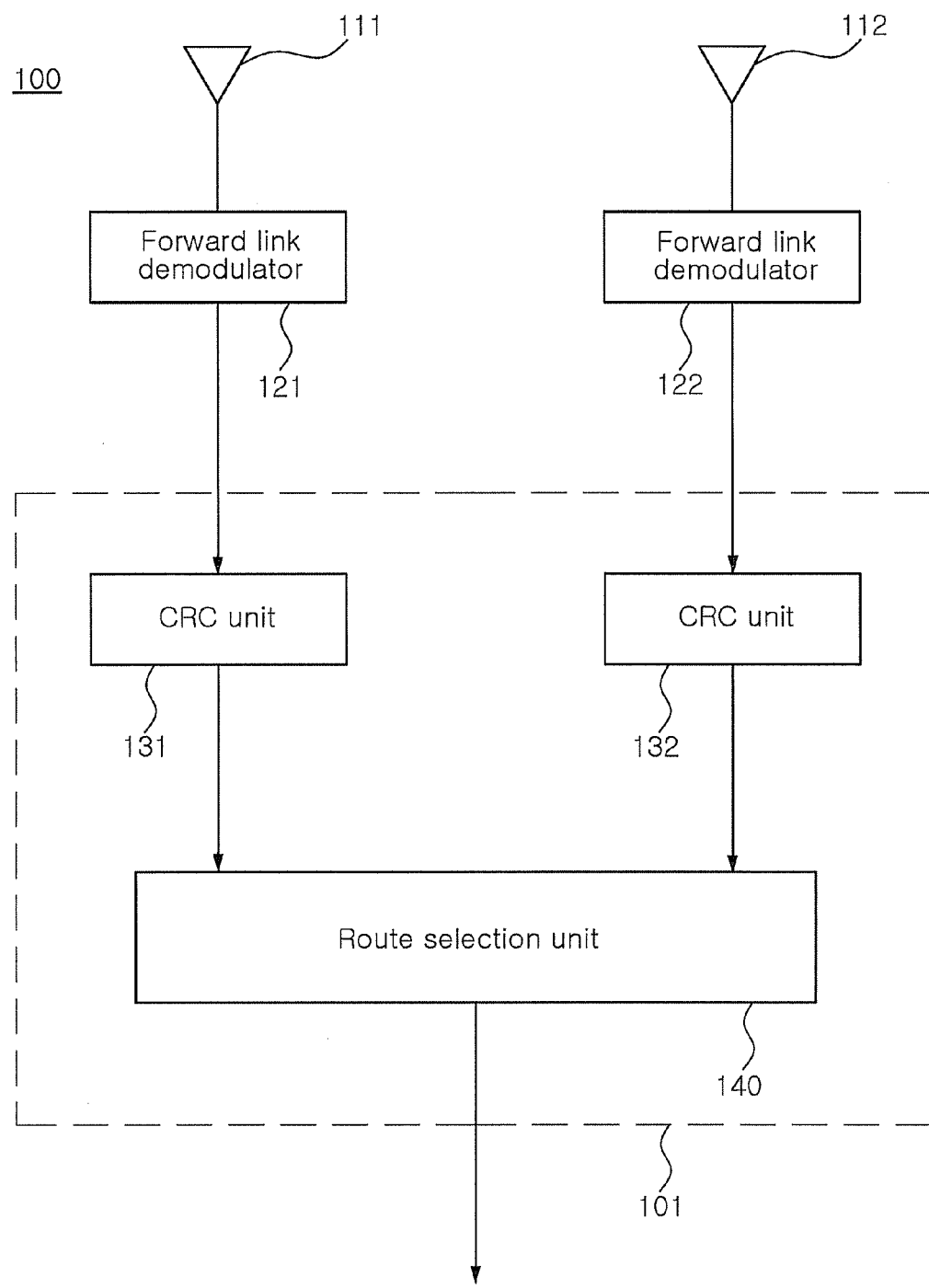
FIG. 1 is a schematic block diagram showing the configuration of a mobile satellite transmission/reception apparatus according to an exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram showing the configuration of a mobile satellite transmission/reception apparatus according to an exemplary embodiment of the present invention.

With reference to FIG. 1, a mobile satellite transmission/reception apparatus 100 according to an exemplary embodiment of the present invention may include a first antenna unit 111, a second antenna unit 112, and a data processor 101.

The first antenna unit 111 may receive a signal along a first communications route, and the second antenna unit 112 may receive a signal along a second communications route. In the present exemplary embodiment, the first communications route is a route along which the first antenna unit may directly receive a signal which has been transmitted from a satellite, and the second communications route is a route along which the second antenna unit may receive a signal which has been transmitted from the satellite via a satellite repeater.

In a satellite communications scheme, when a transmitter/receiver is located in an open area, it can directly communicate with a satellite, but when the transmitter/receiver cannot perform direct communications with the satellite because it enters a tunnel or the like, it may perform communications via a repeater. Accordingly, in the present exemplary embodiment, providing the first and second communications routes and allowing signals to be received by different antenna units may enable a satellite communications reception device mounted in a vehicle, a train, and the like, to receive satellite signals even while on the move.

The first and second antenna units 111 and 112 may be connected to forward link demodulators 121 and 122, respectively. Thus, signals received by the first and second antenna units 111 and 112 may be output in the form of particular packet streams via the forward link demodulators 121 and 122. In the present exemplary embodiment, the signals which have passed through the forward link demodulators 121 and 122 may be output in the form of MPEG-2 TS packets.

The data processor 101 compares the cyclic redundancy check (CRC) values of packets in packet streams of signals received by the first and second antenna units 111 and 112, respectively. If packets having the same CRC value are detected, the data processor 101 may change a communications route to one of the first and second communications routes. For example, the first processor 101 may select the first communications route to allow the satellite and the mobile satellite transmission/reception apparatus to perform communications with each other. When a signal received by the second antenna unit 112 is received by the data processor 101 as the mobile satellite transmission/reception apparatus moves, the data processor 101 compares the CRC value of the packet stream of the signal received by the first antenna unit 111 and that of the packet stream of the signal received by the second antenna unit 112, and when the CRC value of a packet received by the first antenna unit 111 and that a packet received by the second antenna unit 112 are identical, the data processor 101 may change the communications route of the mobile satellite transmission/reception apparatus to the second communications route. Likewise, the data processor 101 may select the second communications route for communication, and when a signal received by the first antenna unit 111 is received by the data processor 101, the data processor 101 compares the CRC value of the packet stream of the signal received by the first antenna unit 111 and that of the packet stream of the signal received by the second antenna unit 112, and when the CRC value of a packet received by the first antenna unit 111 and that a packet received by the second antenna unit 112 are identical, the data processor 101 may change the communications route of the mobile satellite transmission/reception apparatus to the first communications route.

In the present exemplary embodiment, the data processor 101 may include a first CRC unit 131 for executing CRC on the packet stream of the signal received by the first antenna unit 111, a second CRC unit 132 for executing CRC on the packet stream of the signal received by the second antenna unit 112, and a route selection unit 140 for comparing the CRC values of packets in the packet streams of the signals received by the first and second antenna units 111 and 112, and changing a pre-set communications route to a different route if packets having the same CRC value are detected. In the present exemplary embodiment, in order to compensate for a time delay between the packet stream which has passed through the first CRC unit 131 and the packet stream which has passed through the second CRC unit 132, buffers may be connected to the first and second CRC units, respectively.

Here, the CRC refers to a scheme using cyclic binary codes to detect an error possibly generated during a data transmission process. If a transmitter side divides data into blocks, attaches a cyclic code obtained through a special calculation of binary polynomial expression to the end of each block, and transmits the same, then it may be determined whether or not a transmission error has occurred, depending on whether a receiver side has obtained the same cyclic codes through the same calculation. This method is more sophisticated than the method based on parity bits, having superior error detection capabilities, and allowing a coder or decoder to have a simpler error detection circuit, so the method can be used for communications protocols such as X-modem, commit, or the like.

Figure 2:
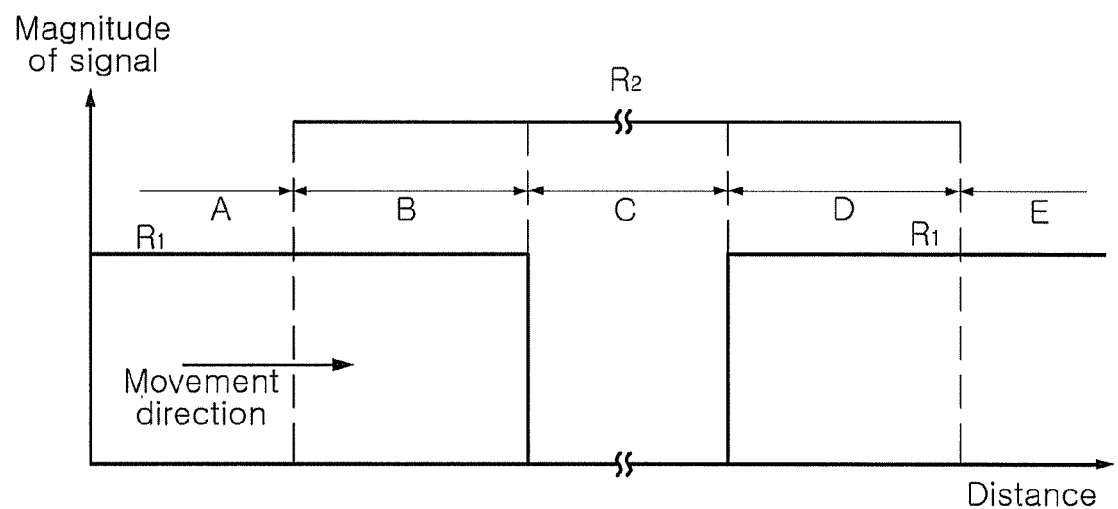
FIG. 2 illustrates the communications route setting order according to the movement of the mobile satellite transmission/reception apparatus according to the exemplary embodiment of FIG. 1.

FIG. 2 illustrates the communications route setting order according to the movement of the mobile satellite transmission/reception apparatus according to the exemplary embodiment of FIG. 1. The operation of the mobile satellite transmission/reception apparatus according to the exemplary embodiment of FIG. 1 will now be described with reference to FIG. 2.

As shown in FIG. 2, first to fifth sections (i.e., A to E) may represent the distance along which an object (e.g., a train) including the mobile satellite transmission/reception apparatus may move. Here, a case where the object including the mobile satellite transmission/reception apparatus passes through an open section and a tunnel section will now be described.

In the present exemplary embodiment, a signal (R1) received along the first communications route, along which a signal which has been transmitted from a satellite is directly received, may exist in the first, second, fourth, and fifth sections (i.e., A, B, D, and E), and a signal (R2) received along the second communications route, along which a signal transmitted from the satellite is received via a repeater, may exist in the second to fourth sections (i.e., B, C, and D). Namely, in the second and fourth sections (B and D), the entrance and exit of the tunnel, the signal received along the first communications route and the signal received along the second communications route are simultaneously received by the mobile satellite transmission/reception apparatus, so the communications route, along which the mobile satellite transmission/reception apparatus communicates with the satellite, may be changed to one of the first and second communications routes by the route selection unit of the mobile satellite transmission/reception apparatus. In the process of changing the communications route, it is important not to generate data interruption.

In the present exemplary embodiment, in the first section (A), the mobile satellite transmission/reception apparatus passes through an open area and can receive a signal only along the first communications route, along which a signal is directly received from the satellite. Thus, in this section, the route selection unit 140 of the mobile satellite transmission/reception apparatus can set the first communications route as a communications route.

The second section (B) may correspond to a case where the mobile satellite transmission/reception apparatus moves in the movement direction to enter the tunnel. In this case, the mobile satellite transmission/reception apparatus may receive both the signal (R1) received through the first communications route, along which a signal is directly received from the satellite, and the signal (R2) received along the second communications route, along which a signal is received via a repeater. In this case, because the first communications route is set as the communications route in the first section (A), when signals start to be received along the second communications route, the route selection unit 140 may perform the process of comparing a CRC value of a packet stream of the signal received along the first communications route and that of a packet stream of the signal received along the second communications route. As the mobile satellite transmission/reception apparatus moves further, the signals received along the second communications route will increase. The route selection unit 140 compares the CRC values of the packets of the signals received by the first and second communications routes, and at a point of time when packets having the same CRC value are generated, the route selection unit may change the communications route of the mobile satellite transmission/reception apparatus from the first communications route to the second communications route. After the communications route is changed, the second communications route may be maintained in the second section (B).

In the third section (C), the mobile satellite transmission/reception apparatus may move in the movement direction and pass through the interior of the tunnel. In this case, the mobile satellite transmission/reception apparatus can receive signals only along the second communications route without having signals received along the first communications route. Namely, because the mobile satellite transmission/reception apparatus is within the tunnel, it cannot receive signals directly received from the satellite but only receive signals transmitted from the satellite, via a repeater. In this case, because signals are only received along the single communications route, the route selection unit 140 may maintain the second communications route so that communications can be performed continuously along the currently selected second communications route.

In the fourth section (D), the mobile satellite transmission/reception apparatus may move in the movement direction and exit the tunnel. In this case, the mobile satellite transmission/reception apparatus may receive both the signal (R1) received through the first communications route, along which a signal is directly received from the satellite, and the signal (R2) received along the second communications route, along which a signal is received via a repeater. In this case, because the second communications route has been maintained as the communications route up to the third section (C), when signals start to be received along the first communications route, the route selection unit 140 may perform the process of comparing a CRC value of a packet stream of the signal received along the first communications route and a CRC value of a packet stream of the signal received along the second communications route. As the mobile satellite transmission/reception apparatus moves further, the signals received along the first communications route will increase. The route selection unit 140 compares the CRC values of the packets of the signals received by the first and second communications routes, and at a point of time when packets having the same CRC value are generated, the route selection unit may change the communications route of the mobile satellite transmission/reception apparatus from the second communications route to the first communications route. After the communications route is changed, the first communications route may be maintained in the fourth section (D).

In the fifth section (E), the mobile satellite transmission/reception apparatus may move in the movement direction and pass through an open area. In this case, the mobile satellite transmission/reception apparatus may receive signals only along the first communications route without having a signal received along the second communications route. Namely, because the repeater for the second communications route is positioned within the tunnel, after the mobile satellite transmission/reception apparatus moves out of the tunnel, signals received via the repeater may not be received by the mobile satellite transmission/reception apparatus. In this case, because signals are received only along the single communications route, the route selection unit may maintain the first communications route so that communications can be performed along the currently selected first communications route.

In this manner, in the present exemplary embodiment, in case of changing the communications routes from the first communications route to the second communications route or from the second communications route to the first communications route, the CRC values of the packets of the received signals are compared, and at the time point when packets having the same CRC value are generated, the communications route can be changed, rather than based on the strength of a received signal. Namely, because the communications route is changed at the moment when packets are synchronized, the occurrence of data interruption can be prevented in changing the communications route.

Figure 3:
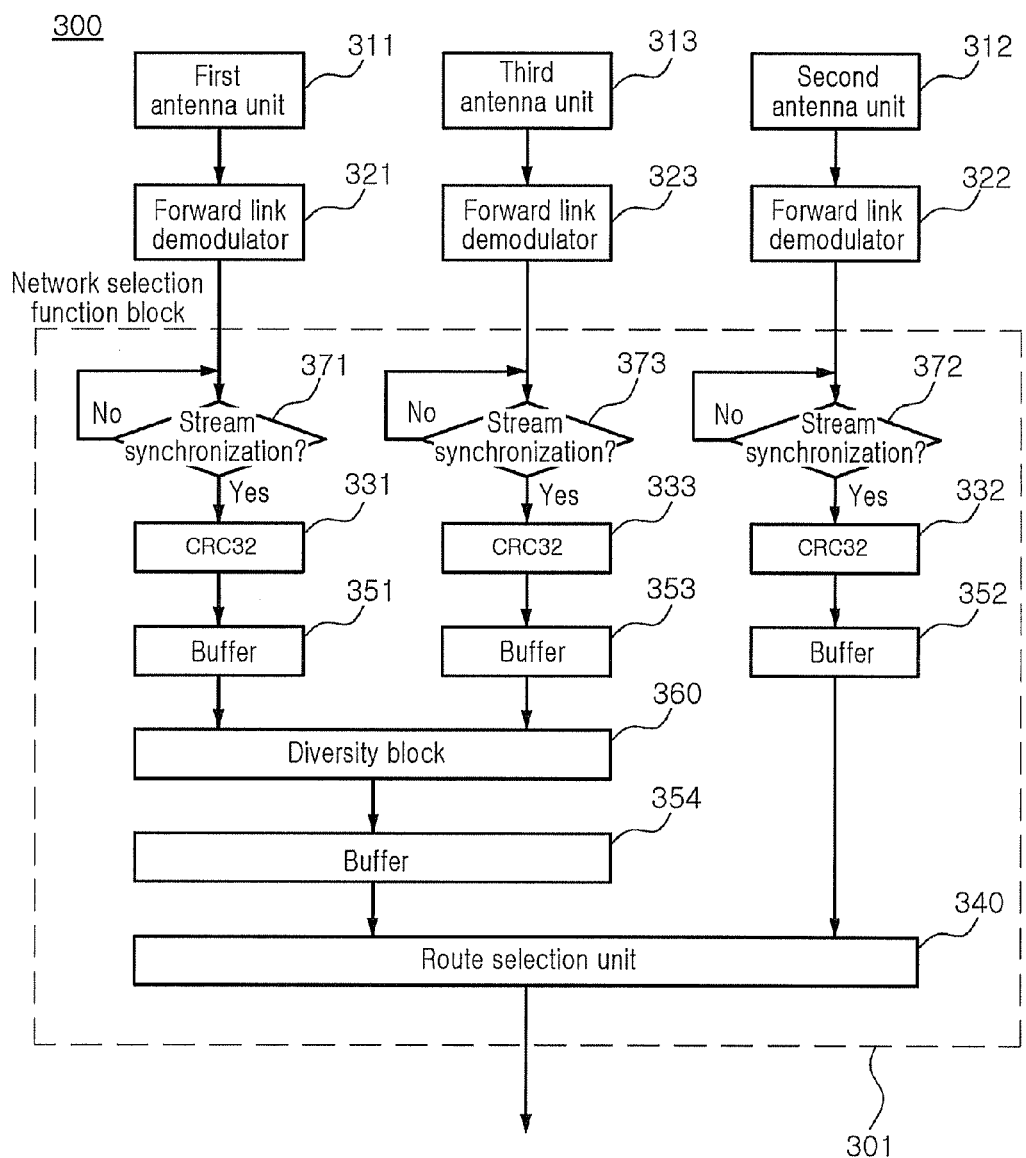
FIG. 3 illustrates the configuration of a mobile satellite transmission/reception apparatus according to another exemplary embodiment of the present invention.

FIG. 3 illustrates the configuration of a mobile satellite transmission/reception apparatus according to another exemplary embodiment of the present invention.

With reference to FIG. 3, a mobile satellite transmission/reception apparatus 300 may include a first antenna unit 311, a second antenna unit 312, a third antenna unit 313, and a data processor 301.

In the present exemplary embodiment, the first and third antenna units 311 and 313 may receive signals along a first communications route, while the second antenna unit 312 may receive a signal along a second communications route. In the present exemplary embodiment, the first communications route is a route along which the first antenna unit may directly receive a signal which has been transmitted from a satellite, and the second communications route is a route along which the second antenna unit may receive a signal which has been transmitted from the satellite via a satellite repeater.

In a satellite communications scheme, when a transmitter/receiver is located in an open area, it can directly communicate with a satellite, but when the transmitter/receiver cannot perform direct communications with the satellite because it enters a tunnel or the like, it may perform communications via a repeater. Accordingly, in the present exemplary embodiment, providing the first and second communications routes and allowing signals to be received by different antenna units may enable a satellite communications reception device mounted in a vehicle, a train, and the like, to receive satellite signals even while on the move.

In the present exemplary embodiment, the third antenna unit 313 may be disposed to be spaced apart by a certain interval from the first antenna unit 311. By separately disposing the antennas having the same communications route, a diversity function can be implemented to maintain a stable communications state.

Forward link demodulators 321, 322, and 323 may be connected to the first to third antenna units 311 to 313, so that signals received by the first to third antenna units 311 to 313 may be output in the form of a particular stream via the forward link demodulators 321 to 323. In the present exemplary embodiment, signals which have passed through the forward link demodulators 321 to 323 may be output in the form of an MPEG-2 TS packet.

In the present exemplary embodiment, the data processor 301 may include first to third CRC units 331 to 333, first to third buffers 351 to 353, an antenna diversity block 360, a fourth buffer 354, and a route selection unit 340.

The first to third CRC units 331 to 333 may execute CRC on the signal packet streams received by the first to third antenna units 311 to 313. The signals demodulated after being received by the first to third antenna units 311 to 313 may be stream-synchronized so as to be input to the first to third CRC units 331 to 333. Here, the CRC refers to a scheme using cyclic binary codes to detect an error possibly generated during a data transmission process. If a transmitter side divides data into blocks, attaches a cyclic code obtained through a special calculation of binary polynomial expression to behind each block, and transmits the same, then it may be determined whether or not a transmission error has occurred depending on whether a receiver side has obtained the same cyclic codes through the same calculation. This method is more sophisticated than the method based on parity bits, having superior error detection capabilities, and allows a coder or decoder to have a simpler error detection circuit, so the method can be used for communications protocols such as X-modem, commit, or the like.

The first to third buffers 351 to 353 may be connected to the first to third CRC units 331 to 333 to compensate for a time delay generated between the packet streams respectively received by the first to third antenna units 311 to 313.

In the present exemplary embodiment, because the first to third antenna units 311 to 313 are disposed to be separated by a certain interval from each other, although the signals are received by the first and third antenna units 311 and 313 along the same communications route, a certain time delay may occur between the packet streams of the signal received via the first antenna unit 311 and the packet streams of the signal received via the third antenna unit 313.

Figure 4A:
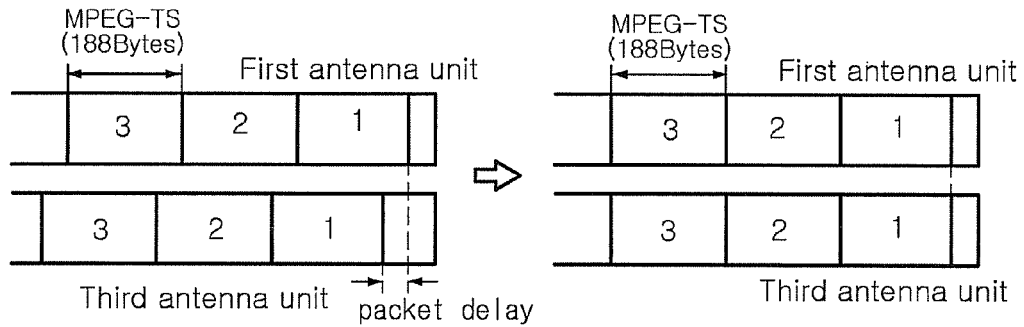
FIGS. 4(a) and 4(b) are a conceptual view of aligning packet streams in the first to third buffers of FIG. 3 and a conceptual view of re-setting packet streams in a diversity block, respectively.

With reference to FIG. 4(a), it is shown that a time delay occurs between the packet streams of the signals received via the first and third antenna units 311 and 313. The signal received via the first antenna unit 311 and the signal received via the third antenna unit 313 may be represented by streams having a plurality of packets, and in this case, the signal received by the third antenna unit 313 has a certain packet delay compared with the signal received by the first antenna unit 311, causing a problem in that it is difficult to align corresponding packets between the packet stream of the signal received by the first antenna unit 311 and the packet stream of the signal received by the third antenna unit 313. The first and third buffers 351 and 353 in FIG. 3 compensate for the time delay between the packet stream of the signal received by the first antenna unit 311 and the packet stream of the signal received by the third antenna unit 313 which have passed through the CRC units, align the two streams, and input the aligned streams to the antenna diversity block 360.

When at least one of mutually corresponding packets in the packet streams which have passed through the first and third buffers 351 and 353 is normal, the antenna diversity block 360 may output a normal packet. In the present exemplary embodiment, when packets which have passed through the buffer 351 are normal packets, the antenna diversity block 360 outputs the corresponding packets, whereas if packets which have passed through the buffer 351 have an error, the antenna diversity block 360 checks the packets which have passed through the third buffer 353 at the positions corresponding to the erroneous packets, and if they are normal, the antenna diversity block 360 may output the packets which have passed through the third buffer 353. Accordingly, only when both the packets in the packet stream which has passed through the first buffer 351 and the packets in the packet stream which has passed through the third buffer 353 are erroneous, the antenna diversity block 360 may output the erroneous packets.

Figure 4B:
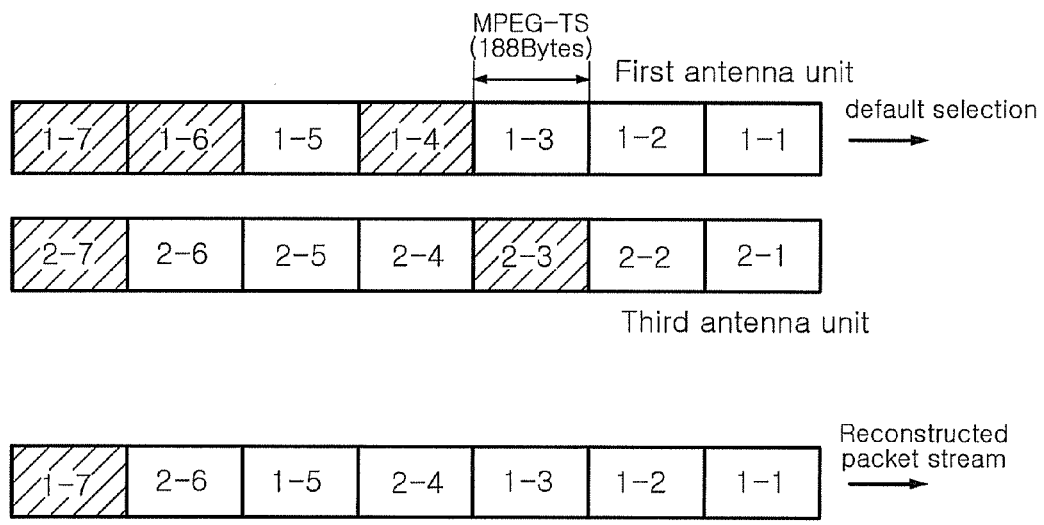

FIG. 4(b) illustrates the packet stream of the signal received via the first antenna unit 311 and the packet stream of the signal received via the third antenna unit 313, which are input to the antenna diversity block 360, and a packet stream output after being reconstructed in the antenna diversity block 360.

In the present exemplary embodiment, the packet stream of the signal received via the first antenna unit 311 is set as a default value, and when the packets (1-1, 1-2, 1-3, and 1-5) of the signal received by the first antenna unit 311 are normal, the antenna diversity block 360 can output the packets of the signal received by the first antenna unit 311. If the packets (1-4, 1-6, and 1-7) of the signal received by the first antenna unit 311 have an error, the packets of the signal received by the third antenna unit 313 are inspected, and if the packets (2-4 and 2-6) of the signal received by the third antenna unit 313 are normal, the packets of the signal received by the third antenna unit 313 can be output. In this case, if the packets of the signal received by the third antenna unit 313 have an error, the packet (1-7) received by the first antenna unit 311 may be output. Accordingly, the output packet streams of the antenna diversity block 360 according to the present exemplary embodiment may be combinations of the packets (1-1, 1-2, 1-3, 1-5, and 1-7) of the signal received by the first antenna unit 311 and the packets (2-4 and 2-6) of the signal received by the third antenna unit 313.

The second buffer 352 and the fourth buffer 354 may compensate for a time delay generated between a packet stream of a signal received by the second antenna unit 312 and the packet stream output from the antenna diversity block 360. Namely, the second buffer 352 and the fourth buffer 354 align the packet stream of the signal received by the second antenna unit 312 and the packet stream output from the antenna diversity block 360, respectively, and input the aligned packet streams to the route selection unit 340.

The route selection unit 340 may compare CRC values of the packets in the packet stream output from the second buffer 352 and the fourth buffer 354 and select a communications route. In the present exemplary embodiment, the operation of the route selection unit 340 may be similar to that of the route selection unit 140 as described above with reference to FIG. 2.

On the assumption that a train including the mobile satellite transmission/reception apparatus passes through an open section and a tunnel section, a detailed operation of the route selection unit 340 will now be described.

When the mobile satellite transmission/reception apparatus passes through an open area, signals may be received via the first and third antenna units 311 and 313. The packet streams of the signals received via the first and third antenna units 311 and 313 may be aligned through the first and third buffers 351 and 353, and then output via the antenna diversity block 360. In this case, the route selection unit 340 may set the first communications route as a communications route.

When the mobile satellite transmission/reception apparatus moves in the movement direction and at the point of time when the mobile satellite transmission/reception apparatus enters the tunnel, it may also receive a signal via the second antenna unit 312, as well as via the first and third antenna units 311 and 313.

The route selection unit 340 may perform the process of comparing the CRC values of the packet stream of the signal output from the antenna diversity block 360 and the CRC values of the packet stream of the signal received by the second antenna unit 312. At a point of time when the packet which has passed through the antenna diversity block 360 and the packet of the signal received by the second antenna unit 312 have the same CRC value, the route selection unit 340 may change the communications route of the mobile satellite transmission/reception apparatus from the first communications route to the second communications route.

The mobile satellite transmission/reception apparatus continuously moves in the movement direction and, when and while it passes through the interior of the tunnel, the mobile satellite transmission/reception apparatus can receive signals only along the second communications route without having signals received along the first communications route. Namely, because the mobile satellite transmission/reception apparatus is within the tunnel, it cannot receive signals directly received from the satellite but only receive signals transmitted from the satellite, via a repeater. In this case, because signals are received only along the single communications route, the route selection unit may maintain the second communications route so that communications can be performed continuously along the currently selected second communications route.

The mobile satellite transmission/reception apparatus continuously moves in the movement direction, and when it gets out of the tunnel, the mobile satellite transmission/reception apparatus may receive both the signal received through the first communications route, along which a signal is directly received from the satellite, and the signal received along the second communications route, along which a signal is received via a repeater. In this case, because the second communications route has been maintained as the communications route so far, when signals start to be received along the first communications route, the route selection unit 340 may change the communications route of the mobile satellite transmission/reception apparatus from the second communications route to the first communications route at the point of time when the packet which has passed through the diversity block 360 and the packet of the signal received by the second antenna unit have the same CRC value are generated.

The mobile satellite transmission/reception apparatus moves in the movement direction, and when it passes through an open area, the mobile satellite transmission/reception apparatus may receive signals only along the first communications route without having a signal received along the second communications route. Namely, because the repeater for the second communications route is positioned within the tunnel, after the mobile satellite transmission/reception apparatus moves out of the tunnel, signals received via the repeater may not be received by the mobile satellite transmission/reception apparatus. In this case, because signals are received only along the single communications route, the route selection unit may maintain the first communications route so that communications can be performed along the currently selected first communications route.

As set forth above, the mobile satellite transmission/reception apparatus according to exemplary embodiments of the invention ensures continuous transmission of data without causing an interruption when communications routes are changed.

While the present invention has been shown and described in connection with the exemplary embodiments, it will be apparent to those skilled in the art that modifications and variations can be made without departing from the spirit and scope of the invention as defined by the appended claims.

What is claimed is:

1. A mobile satellite transmission/reception apparatus comprising:
   a first antenna unit configured to receive a signal along a first communications route;
   a second antenna unit configured to receive a signal along a second communications route;
   a third antenna unit configured to receive a signal along the first communications route and disposed at a pre-set interval from the first antenna; and
   a data processor configured to compare cyclic redundancy check (CRC) values with respect to packet streams of signals respectively received by the first and second antenna units, and change communications route to one of the first and second communications routes if packets having the same CRC value are detected,
   wherein the data processor comprises:
   first to third CRC units configured to be connected to the first to third antenna units, respectively, and execute CRC on packet streams of signals received by the respective antennas;

first to third buffers connected to the first to third CRC units, respectively, and compensate for a time difference generated between the packet streams of the signals received by the first to third antennas;

an antenna diversity block configured to output a normal packet when at least one of corresponding packets in the packet stream which has passed through the first buffer and the packet stream which has passed through the third buffer is normal;

a fourth buffer configured to compensate for a time difference generated between a packet stream output from the antenna diversity block and the packet stream which has passed through the second buffer; and a route selection unit configured to compare CRC values of packets of packet streams output from the second and fourth buffers and change a pre-set communications route to a different communications route if packets having the same CRC value are detected.

2. The apparatus of claim 1, wherein the first antenna unit directly receives a signal which has been transmitted from a satellite, and the second antenna unit receives a signal which has been transmitted from a satellite, via a repeater.

* * * * *